Dec. 14, 1965     G. H. SCHIPPEREIT     3,223,519
INDUCTION FURNACE
Filed May 20, 1957

INVENTOR.
GEORGE H. SCHIPPEREIT
BY Gray, Mase
       & Dunson
ATTORNEY

United States Patent Office 3,223,519
Patented Dec. 14, 1965

3,223,519
INDUCTION FURNACE
George H. Schippereit, Columbus, Ohio, assignor, by mesne assignments, to National Distillers and Chemical Corporation, a corporation of Virginia
Filed May 20, 1957, Ser. No. 660,287
4 Claims. (Cl. 75—10)

This invention relates to induction melting and particularly to low- and line-frequency induction furnaces.

Induction furnaces may be classified broadly into three categories: (1) Core-type low-frequency induction furnaces, (2) coreless high-frequency induction furnaces, and (3) coreless low-frequency induction furnaces. All induction furnaces operate on the principle of inducing an electric current into the metal to be heated. By supplying an alternating current to a primary induction coil, a reverse alternating current is induced into any electrical conductor lying within the magnetic field of the coil. This action may be likened to that of a transformer where a primary coil surrounds a secondary coil, except that the main purpose of induction heating is to generate heat in the metal charge which corresponds to the secondary coil in this analogy.

In the core-type of low-frequency induction furnace a molten ring or loop of metal contained in a refractory channel acts as a transformer secondary looping an iron core. Energy supplied to the core by the primary coil induces a flow of current in the molten metal and produces heat. The difficulties in employing this type of furnace lie in its elaborate construction. In addition it is necessary to maintain a complete metal path in the refractory chamber in order to provide a complete secondary circuit. The intensity of the magnetic field that may be applied is limited due to the fact that an intense induced current causes "pinch effect" or a separation of the molten conductor and thus an interruption in the flow of current. Such furnaces with refractory chambers are impractical for melting highly active metals such as titanium and zirconium.

The coreless furnace, as its name implies, operates without a core and therefore consists merely of a load concentric with an induction coil. Since there is no magnetic core, a portion of the field produced by the primary coil is lost and the energy transfer becomes more difficult. There are two methods of compensating for this factor, either to operate at higher frequencies or to increase the intensity of the magnetic field produced by the primary coil, and hence increase the current circulating in the load. The first method is exploited by the use of high-frequency induction heating.

Alternating currents flowing in a conductor have a tendency to crowd to the outer surface because the electromagnetic induction increases the impedance of the inner fibers of the conductor. Induced currents react in a similar manner. If the frequency of the alternating current is gradually increased, this so-called "skin effect" becomes more and more pronounced until at the frequencies which are used for high-frequency induction heating, the current is flowing in the shell made up of the outer few thousandths of an inch and the center or core of the melt receives most of its heat by thermal conduction from the surface. High-frequency induction furnaces have advantages over low-frequency induction furnaces in some applications, but require considerably more equipment most of which is necessary to generate the high frequencies.

A disadvantage of high-frequency induction furnaces and prior known low-frequency coreless furnaces is the contaminating effect of the crucible on the molten metal.

In the past, it has been considered necessary for induction melting devices to use refractory crucibles (such as ceramic materials or graphite) to withstand the high melting temperatures. These materials tend to contaminate the charge, particularly when high reactive metals such as titanium and zirconium are being melted.

In the past also, it has been considered impractical to use water cooled metal crucibles, such as are used in cold-mold arc melting, for induction melting, because a metal crucible shields the charge from the applied magnetic field to a considerable extent. Practically, this amounts to an attenuation of the applied field. It has also been pointed out that considerable direct induction heating of the crucible could be expected. These factors, together with the fact that the "skin effect" caused by high frequencies tends to cause maximum heating of the molten metal immediately adjacent the crucible, thus tending to cause "wetting" or alloying between the molten metal and the water cooled crucible, have discouraged the use of induction melting in the past.

A unique low-frequency coreless induction furnace has now been developed that contains a metallic crucible and that overcomes the disadvantages of the prior melting practices. This crucible and furnace have the advantageous features of (a) little or no attenuation of the applied magnetic flux (b) no contamination of the melt (c) uniform chemical compositions (the whole bath will be molten at one time and can be agitated for thorough mixing, also samples can be taken and check analysis made while the bath is being held for suitable adjustment) (d) a greater variety of ingot shapes can be produced and (e) costs are reduced because ingots of chemically uniform compositions are produced in one melting operation as opposed to the prior art method of double melting in cold-mold arc furnaces.

In all that has gone before, and in all that follows, the term "low frequency," "line frequency" and "high frequency," as applied to induction heating, are intended to be interpreted as follows:

"Low frequency" means the frequency range below about 1000 cycles per second.

"Line frequency" means a frequency corresponding to ordinary commercial power frequencies, usually 60 cycles per second in the United States, and 50 cycles per second in Europe.

"High frequency" means frequencies substantially in excess of 1000 cycles per second.

In general the present invention relates to a coreless type low-frequency induction furnace wherein a metal crucible is constructed of segments or sections that are electrically insulated from one another by a nonconductive material so that induced currents may not flow continuously around the circumference of the crucible. As used here, and hereafter in this specification, the words "nonconductive material" are intended to mean materials other than electrical conductors, and to include both electrical insulators and semiconductors of electricity and also materials which will interrupt induced current flow circumferentially of the metal crucible wall. The present invention relates particularly to a segmented metallic crucible wherein the individual metallic segments are insulated from one another by a thin plastic or ceramic material.

Figure 1:
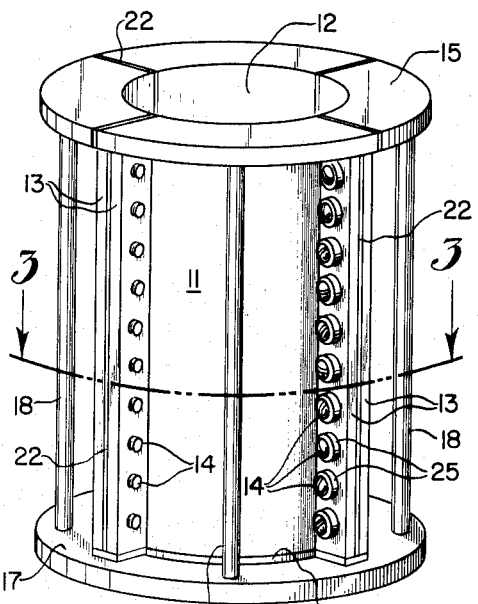
FIG. 1 is a perspective view of a crucible constructed according to this invention.

Referring to FIGS. 1–5 four flanged sections 11 are brought together to form a cylindrically shaped crucible with a hollow or melting area as at 12. The flanges 13 are bolted together with bolts 14. The cylindrically shaped crucible is also provided with an upper flange 15 and a shoulder 16 (see FIG. 2).

The upper flange 15 and shoulder 16 are segmented into four sections, each section being a part of, and continuous with, one of the four flanged sections 11. The purpose of flange 15 is primarily to provide a convenient shoulder for fastening the crucible in a water jacket containing an induction work coil (not shown). This assembly also may be provided with a cover (not shown) that is used to cover the crucible in order to provide a controlled atmosphere to the melting area 12.

Figure 2:
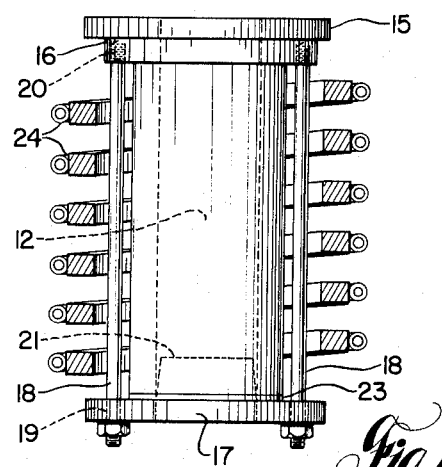
FIG. 2 is a sectional, elevation view of the crucible of FIG. 1.
Figure 3:
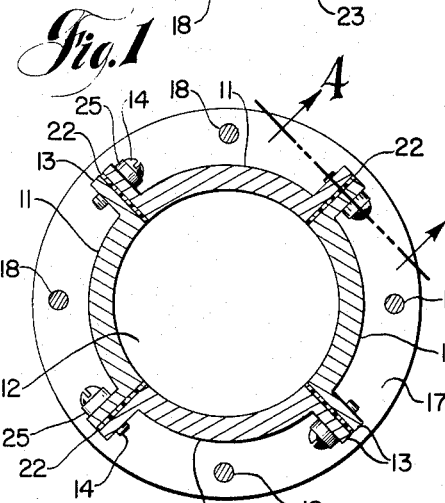
FIG. 3 is a sectional plan view taken along the line 3—3 of FIG. 1.

FIGS. 1, 2, and 3 show the bottom 17 of the furnace which is bolted on with bolts 18 which slide through holes 19 and screw into shoulders 16 as at 20. Bottom 17 is also provided with a projecting area 21 that fits into the crucible and serves to remove heat from the vicinity of gasket 23 and to hold the melt away from this region. The entire bottom is preferably made of the same material as the crucible wall 11. Sections 11 including flanges 15 and shoulders 16 may be made of copper, stainless steel, or any metal possessing sufficient thermal properties to permit adequate heat transfer to the water of a cooling jacket and thus avoid damage to the crucible walls due to the heat in the molten charge. Adequate heat transfer also avoids contamination of the melt by the crucible material. In operation, circulating water or cooling fluid passes over the exterior surfaces of sections 11 and in the embodiment shown, over bottom 17.

Figure 4:
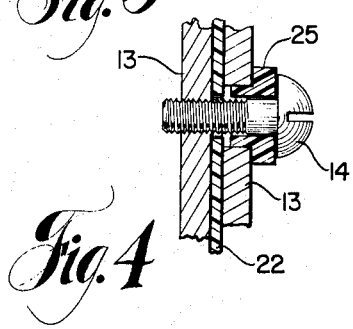
FIG. 4 is a sectional plan view taken along the line 4—4 of FIG. 3.

A nonconductive material 22 is placed between the flanges 13 of the flanged sections 11 as shown in FIGS. 1, 3, and 4. This material may be a plastic, such as an organic resin, or a ceramic material, or any nonconductive material which will serve to insulate flanged sections 11 from one another. This material is continuous between the segmented areas of flange 15 and shoulder 16 so as to insulate the crucible into segments separated by nonconductive material 22. Bolts 14 are drawn sufficiently tight to hold flanges 13 together to constitute a leak-tight seal between the flanges. It is preferable to keep material 22 thin, particularly if it is an organic material, so that the surrounding metal will transfer sufficient heat away from the plastic nearest the melt and avoid damage to the organic materials and also avoid contamination of the charge. Similar reasons apply if material 22 is a ceramic material. It has been found to be advantageous to use a thin strip (0.010 inch) of a plastic material such as a polytetrafluoroethylene produced by the E. I. du Pont Company under the trade name Teflon.

As illustrated by FIG. 4 the bolts 14 used in flanges 13 to hold sections 11 together are insulated from one of the two sections 11 by insulating bushings 25. In this construction all the sections 11 are insulated from one another precluding the possibility of a complete current path in the wall 11 around the circumference of the crucible. This considerably reduces the shielding action or attenuation that would be presented by an electrically continuous crucible. This is one of the primary advantages of this crucible. It makes possible the use of relatively thick walled copper for sections 11.

Figure 5:
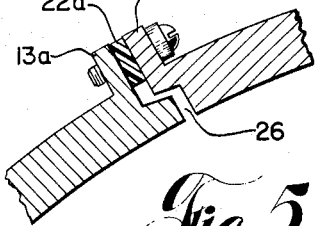
FIG. 5 is a cross-sectional view through a vertical flange of a modified version of the crucible of FIG. 1.

Another useful flange design is shown by FIG. 5. Here the flanges are crimped in such a manner that the flange sections 13a fit together, as shown, constituting a shade for insulating material 22a, protecting it from direct heat radiation from the melt. The part of the opening 26 between flange 13a that is closest to the melt is sufficiently narrow to prevent the molten metal from entering the space, by virtue of surface tension of the melt. Also, the cold walls solidify the molten metal upon contact before it has time to flow into the opening.

As shown in FIGS. 1 and 2, bottom 17 is preferably separated from the rest of the crucible by nonconductive washer or ring 23. This washer surrounds the center 21 of bottom 17 and is continuous under each flange section 11 including the flanges. Washer 23 provides a continuous nonconductive area between bottom 17 and the rest of the crucible. This washer may be made of almost any nonconductive material which is suitable for a leak-tight seal, for example neoprene. This material is protected from overheating by the action of bottom portions 17 and 21 in transferring heat away from this region. The bottom 17 and the material 23 are held tightly in place by bolts 18, of which, in the embodiment illustrated, there are four, one between each set of flanges in sections 11. Bolts 18 are drawn up tightly to seal off the bottom of the crucible. As in the case of bolts 14, it may be desirable to insulate bolts 18 from the crucible; however, ordinarily this will not be necessary because the bolts 18 offer a long current path, and hence, a relatively high resistance to any currents which flow between sections 11 via bolts 18.

The induction coil or work coil is illustrated in FIG. 2 as 24, to show the approximate position of the work coil as related to the crucible. The area around the coil would be surrounded by circulating cooling water and possibly water would flow through a hollow work coil.

Figure 6:
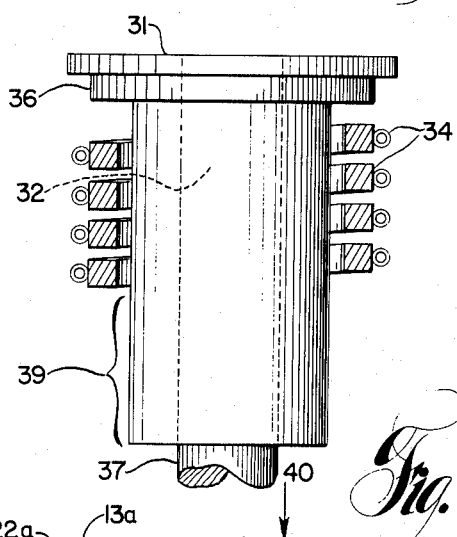
FIG. 6 is a sectional view through the side of another crucible constructed according to this invention.

FIG. 6 illustrates a modified version of the crucible of FIG. 1 wherein continuous melting and withdrawal are effected. The details of this crucible, such as flange sections, insulating materials between the flanges, etc. are the same as the crucible illustrated in FIG. 1. However, this crucible has no bottom. The top flange 31 serves the same function as flange 15 of FIG. 1 and a protective atmosphere is provided. The work coil 34 does not extend the full length of the crucible leaving a portion 39 of the crucible unaffected by induction effects. Thus in operation, metal is melted by induction in the portion of the crucible affected by the flux of the work coil 34, solidifies in the unaffected area 39, and is withdrawn as a continuous ingot, as at 37. In this modification it is preferred that the inside diameter of the crucible be slightly smaller at the top than at the bottom, to facilitate the continuous withdrawal of the solidified ingot. To maintain continuous operation, metal must be continuously added at the top of the furnace while an ingot is being continuously withdrawn. Force to withdraw the ingot 37 continuously may be applied as illustrated by arrow 40. It is also preferable to provide an inert atmosphere at the bottom of this crucible where the ingot is being withdrawn particularly when melting highly reactive metals, such as titanium and zirconium. This may be done by using a flange similar to the one at the top and by employing commercially available vacuum seals.

The attenuation of an applied magnetic field passing through a metallic crucible wall is influenced by the number of vertical insulated segments and also by (1) the thickness of crucible material, (2) the type of metal employed for the crucible, (3) the frequency of the induction power source, and (4) diameter of the crucible.

With an unlaminated metal crucible, all the magnetic flux within the crucible cavity contributes to the current flow in the shell. With one longitudinal slit or insulated separation of the crucible, the current path around the circumference of the crucible is eliminated and a considerable improvement in electrical efficiency is effected.

For effective heating, the minimum diameter of the crucible is determined by the minimum load diameter.

The minimum load diameter is determined by the depth of current penetration and should be at least three to five times the depth of penetration. For example, the penetration by the magnetic flux into molten titanium at 60 cycles is 3.3 inches, which makes a desired crucible diameter (for this case) a minimum of about 10 inches. The maximum diameter of the crucible and load will probably be determined by electrical power requirements and mechanical size limitations. A diameter of 24 inches or more is not impractical.

The crucible material or metal must not melt or be damaged under the conditions employed. Conditions that will affect crucible temperature include wall thickness and type of cooling. The crucible metal may be the same as that of the melt, i.e., a titanium crucible may be used to melt titanium. The power loss and attenuation are lower when crucible materials of relatively high electrical resistivity are employed. However, for other reasons, it is probably preferable to employ a metal with high heat transfer properties such as copper, i.e., to reduce probability of wetting between the melt and the crucible.

Coil currents somewhat higher than used in prior known induction melting practices are required to overcome heat loss because of the low temperature of the crucible wall. In prior practice coil currents of the order of 6000–7000 amperes at 60 cycles per second, and of 300–500 amperes at 2000 cycles per second are usual. Preliminary observations indicate that coil currents in the present device will be of the order of 15,000 amperes at 60 cycles per second, and in the order of 3500 amperes at 2000 cycles per second. The crucible wall must be kept cool to prevent alloying by the molten metal. In either cold-mold induction melting or cold-mold arc melting of refractory metals, heat loss by conduction through the crucible wall to the cooling system is relatively large because it is necessary to maintain the crucible wall at a relatively low temperature to avoid alloying and contamination. The heat loss in high-frequency induction melting is greater than for arc melting, because in such heating the heat is generated at and near the surface of the charge adjacent to the cooled wall rather than near the center. This condition creates large thermal gradients near the crucible wall, which give rise to rapid heat flow. In addition, this condition interferes with the formation of a skull that might otherwise offer a certain degree of thermal insulation to the melt. In general, the over-all heat loss and power requirements for high-frequency induction melting in a water-cooled crucible are several times greater than those encountered in cold-mold arc melting. Fortunately, there are some provisions that can be made to reduce the ratio of the heat lost in the cooling system to that retained in the charge. An important advance in this direction is the utilization of lower frequency for the induction power, preferably frequencies of from 25 cycles per second to 1000 cycles per second such as are used in induction furnaces of this invention. The use of low frequencies causes deepening of the zone in which heat is generated within the charge. In a manner of speaking, the heat must then be conducted through a greater thickness of molten metal to reach the crucible wall and more heat is thus retained in the melt.

The electrical circuit around the circumference is broken by segmenting the crucible and the attenuation or shielding action of the crucible is considerably reduced. A general picture of the effects of crucible design on attenuation of the applied magnetic field is derived from a study of data presented in Tables 1 and 2 below. Data for measurements at 60, 200, 500, 1000, 2000 and 5000 cycles per second are presented for copper and stainless steel crucible models. These measurements were made on both electrically continuous hollow cylinders without bottoms and on electrically discontinuous cylinders of various designs simulating segmented crucibles. The values tabulated are percentage attenuation of the applied field.

TABLE 1.—THE ATTENUATION IN PERCENT BY SMALL CRUCIBLES AS A FUNCTION OF FREQUENCY [1]

| Material | No. of Slits | Wall Thickness, inch | Frequency, c.p.s. | | | | | |
|---|---|---|---|---|---|---|---|---|
| | | | 60 | 200 | 500 | 1,000 | 2,000 | 5,000 |
| Copper | None | 0.125 | 30 | 78 | 90 | 95 | 98 | 99 |
| Do | 1 | 0.125 | 4 | 14 | 17 | 15 | 17 | 17 |
| Do | 2 | 0.125 | 4 | 15 | 15 | 15 | 18 | 16 |
| Do | 4 | 0.125 | 3 | 10 | 15 | 13 | 13 | 10 |
| Do | None | 0.250 | 57 | 90 | 95 | 98 | 99 | 99 |
| Do | 1 | 0.250 | 6 | 17 | 18 | 12 | 19 | 18 |
| Do | 2 | 0.250 | 7 | 17 | 17 | 15 | 18 | 15 |
| Do | 4 | 0.250 | 4 | 13 | 16 | 13 | 13 | 10 |
| Stainless steel | None | 0.065 | 1 | 5 | 1 | 11 | 19 | 46 |
| Do | 1 | 0.065 | 1 | 1 | 1 | 2 | 1 | 5 |
| Do | 2 | 0.065 | 1 | 1 | 1 | 1 | 1 | 3 |
| Do | 4 | 0.065 | 1 | 1 | 1 | 1 | 1 | 2 |
| Do | None | 0.125 | 1 | 5 | 1 | 15 | 36 | 66 |
| Do | 1 | 0.125 | 1 | 1 | 2 | 2 | 3 | 11 |
| Do | 2 | 0.125 | 1 | 1 | 1 | 1 | 4 | 8 |
| Do | 4 | 0.125 | 1 | 1 | 1 | 2 | 1 | 5 |
| Do | None | 0.216 | 1 | 8 | 12 | 24 | 51 | 79 |
| Do | 1 | 0.216 | 1 | 1 | 1 | 1 | 4 | 12 |
| Do | 2 | 0.216 | 1 | 1 | 1 | 1 | 6 | 11 |
| Do | 4 | 0.216 | 1 | 1 | 1 | 1 | 3 | 7 |
| Do | None | 0.300 | 1 | 12 | 20 | 36 | 64 | 86 |
| Do | 1 | 0.300 | 1 | 1 | 1 | 2 | 7 | 14 |
| Do | 2 | 0.300 | 1 | 2 | 1 | 1 | 8 | 14 |
| Do | 4 | 0.300 | 1 | 1 | 1 | 2 | 5 | 9 |
| Do | None | 0.500 | 2 | 20 | 30 | 54 | 76 | 92 |
| Do | 1 | 0.500 | 2 | 1 | 4 | 7 | 13 | 14 |
| Do | 2 | 0.500 | 1 | 2 | 2 | 6 | 10 | 11 |
| Do | 4 | 0.500 | 1 | 1 | 1 | 3 | 5 | 10 |

[1] Each crucible was 3.5 inches O.D. and 4.85 inches long. The magnetic field was measured at the central axis of the work coil.

TABLE 2.—THE ATTENUATION IN PERCENT BY LARGE CRUCIBLES AS A FUNCTION OF FREQUENCY [1]

| Material | No. of Slits | Wall Thickness, inch | Attenuation, Percent | | | | | |
|---|---|---|---|---|---|---|---|---|
| | | | Frequency, c.p.s. | | | | | |
| | | | 60 | 200 | 500 | 1,000 | 2,000 | 5,000 |
| Copper [2] | None | ¼ | 97 | 99 | 99 | 99 | 99 | 99 |
| Do | 1 | ¼ | 12 | 14 | 10 | 12 | 11 | 12 |
| Do | 2 | ¼ | 10 | 12 | 9 | 12 | 11 | 12 |
| Do | 4 | ¼ | 8 | 9 | 11 | 13 | 10 | 11 |
| Stainless Steel [3] | None | ¼ | 7 | 38 | 69 | 84 | 91 | 97 |
| Do | 1 | ¼ | 2 | 4 | 5 | 10 | 11 | 10 |
| Do | None | ½ | 24 | 64 | 85 | 93 | 96 | 99 |
| Do | 1 | ½ | 3 | 4 | 4 | 10 | 12 | 10 |

[1] The magnetic field was measured at the center of the induction coil.
[2] For a crucible 21 inches O.D. and 25 inches high.
[3] For a crucible 24 inches O.D. and 25 inches high.

Examination of the data of Table 1 shows that a ¼-inch thick copper sleeve with no slits causes a large attenuation of the magnetic field at all six frequencies. Also, the same copper sleeve causes considerably more attenuation of the field than a ½-inch thick stainless steel sleeve with no slits. The comparison between copper and stainless steel illustrates the effect of electrical resistivity on attenuation. Since the resistivity of stainless steel is considerably higher than copper, the magnitude of currents flowing in the steel are less which, in turn, causes less attenuation. The tables also show that regardless of the degree of attenuation present in a continuous hollow cylinder, or crucible, one slit will serve to materially reduce such a shielding effect. Additional slits generally effect some further reduction of attenuation, particularly at the relatively higher frequencies.

Copper and stainless steel crucibles have been constructed in accordance with FIGS. 1 to 4 of the attached drawing and as described above. All the crucibles have the same dimensions. Each contains four segments that are insulated from each other by a 0.010 inch thick sheet of polytetrafluoroethylene. The bottom sections are insulated from the segmented cylinder by a neoprene washer. The flange bolts are insulated in the manner described by FIG. 4 using a red fiber bushing to insulate the bolt from the flange. The bolts holding the bottom to the top shoulders are not insulated. All bolts are drawn up tightly to seal off all joints. The crucibles have an inside diameter of approximately 2.5 inches, and a wall thickness of about ⅛ inch. These crucibles were successively inserted and fastened into a furnace unit that provided a circulating-water jacket. A 7-turn work coil constructed from ½-inch diameter copper rod was used instead of copper tubing. Heavy, solid copper terminals were built for connecting the coil to the induction unit. Crucibles constructed of each material (copper and stainless steel) were thus tested in melting experiments. A partial vacuum was used and a 2000-cycle source rated at 100 kilowatts was provided to power the induction coil.

Melting tests were performed in the small crucibles; with stainless steel and with titanium, both in a copper crucible and in a stainless steel crucible. Approximately 3½ pounds of stainless steel and 2 pounds of titanium, respectively, were used as the charges and melting was achieved in each test. Macro-structures of the resulting ingots solidified in the melting crucibles showed that a solid skull approximately 3/32-inch thick had been present. None of the ingots melted in the copper crucible stuck to the crucible wall. The power input that was required to melt 3½ pounds of stainless steel or 2 pounds of titanium in either the copper or stainless steel crucibles was about 80 kilowatts. This included electrical circuit losses and heat losses totaling over 50 percent. Melting of a cylindrical stainless steel or titanium charge two inches in diameter and four inches long occurred in about 90 seconds. The flow rate of water around the crucible was about 13 gallons per minute. With this flow rate, the over-all temperature rise of the cooling water did not exceed 25° C.

A new and useful invention having been hereinabove described and defined, it is desired to further set forth the invention in the following claims.

What is claimed is:

1. A low-frequency coreless induction furnace comprising a cup-shaped metal crucible having an inner metal surface formed from a hollow, cylindrically shaped metal part and a disk shaped metal bottom, said cylindrically shaped part being formed of individual metal sections, each of said metal sections constituting a continuous area running the length of said part and said sections being insulated from one another by an electrically nonconductive material, said cylindrically shaped part being insulated from said disk-shaped bottom by an electrically nonconductive material, means surrounding said crucible for providing an induced low-frequency alternating current to the charge contained within and in contact with the inner metal surface of said crucible and means for cooling the outside surface of said crucible.

2. A low-frequency coreless induction furnace comprising a cup-shaped metal crucible having an inner metal surface formed from a hollow, cylindrically shaped metal part and a disk shaped metal bottom, said cylindrically shaped part being formed with at least one slit running substantially longitudinally the length of said part and filled with an electrically nonconductive material, said cylindrically shaped part being insulated from said disk-shaped bottom by an electrically nonconductive material, means surrounding said crucible for providing an induced low-frequency alternating current to the charge contained within and in contact with the inner metal surface of said crucible and means for cooling the outside surface of said crucible.

3. Low-frequency coreless induction melting furnace construction including tubular metal walls forming a crucible chamber with a metal chamber surface, the tubular wall metal being provided with at least one slot means throughout its thickness extending the entire length of the tube, nonconductive electrical insulation material means forming a fluid seal in said slot means, means surrounding said tubular metal walls for providing an induced low-frequency alternating current flow in metal to be melted in contact with the metal surface of said crucible chamber, said slot means and nonconductive means therein forming an interruption to the flow of induced current circumferentially in said tubular metal walls when current flow is induced in metal in said crucible chamber, and means for exteriorly cooling said tubular walls.

4. The method of induction melting of metals comprising introducing and confining said metal within a crucible chamber formed at least by a cylindrical metal wall which provides a metal crucible chamber surface, the cylindrical metal wall being formed with at least one slit running substantially longitudinally the length thereof and filled with an electrically nonconductive material; cooling the outside surface of said crucible wall; subjecting the introduced metal confined within the cooled crucible chamber to a low-frequency alternating current melting flux induced from a primary induction coil surrounding said metal crucible wall; interrupting any circumferential current flow induced by said coil in said metal crucible wall to prevent induction heating of said metal crucible wall; and melting said introduced metal confined in said crucible chamber by said current without wetting or alloying between the crucible chamber surface of said cooled crucible and the introduced metal; thereby avoiding contamination of the introduced metal and damage to the crucible.

References Cited by the Examiner
UNITED STATES PATENTS

| | | | |
|---|---|---|---|
| 1,144,034 | 6/1915 | Giolitte | 22—74 |
| 1,286,395 | 12/1918 | Northoup | 22—74 |
| 1,771,114 | 7/1930 | Fry | 13—27 |
| 1,812,172 | 6/1931 | Rohn | 22—74 |
| 1,940,622 | 12/1933 | Clamer | 75—10 |
| 2,503,819 | 4/1950 | Gunn et al. | 22—200.1 |
| 2,541,764 | 2/1951 | Herres et al. | 22—57.2 |
| 2,770,022 | 11/1956 | Brennan | 22—200.1 |
| 2,851,750 | 9/1958 | Schaaber | 22—57.2 |

FOREIGN PATENTS

| | | |
|---|---|---|
| 1,064,849 | 5/1954 | France. |

MARCUS U. LYONS, *Primary Examiner.*

CLAUDE A. LEROY, RAY K. WINDHAM, NATHAN MARMELSTEIN, *Examiners.*